No. 740,922. PATENTED OCT. 6, 1903.
G. H. RHEUTAN.
STEAM BOILER.
APPLICATION FILED DEC. 8, 1902.
NO MODEL. 5 SHEETS—SHEET 1.

Witnesses:
Adeline C. Ratigan
E. Batchelder

Inventor:
Garrett H. Rheutan
by Wright, Brown & Quinby
Attys.

No. 740,922. PATENTED OCT. 6, 1903.
G. H. RHEUTAN.
STEAM BOILER.
APPLICATION FILED DEC. 8, 1902.
NO MODEL. 5 SHEETS—SHEET 2.
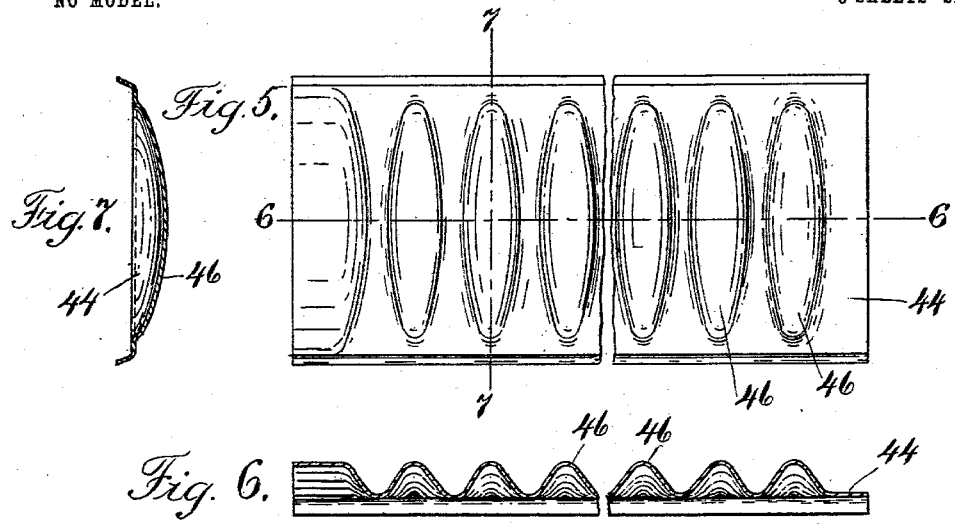
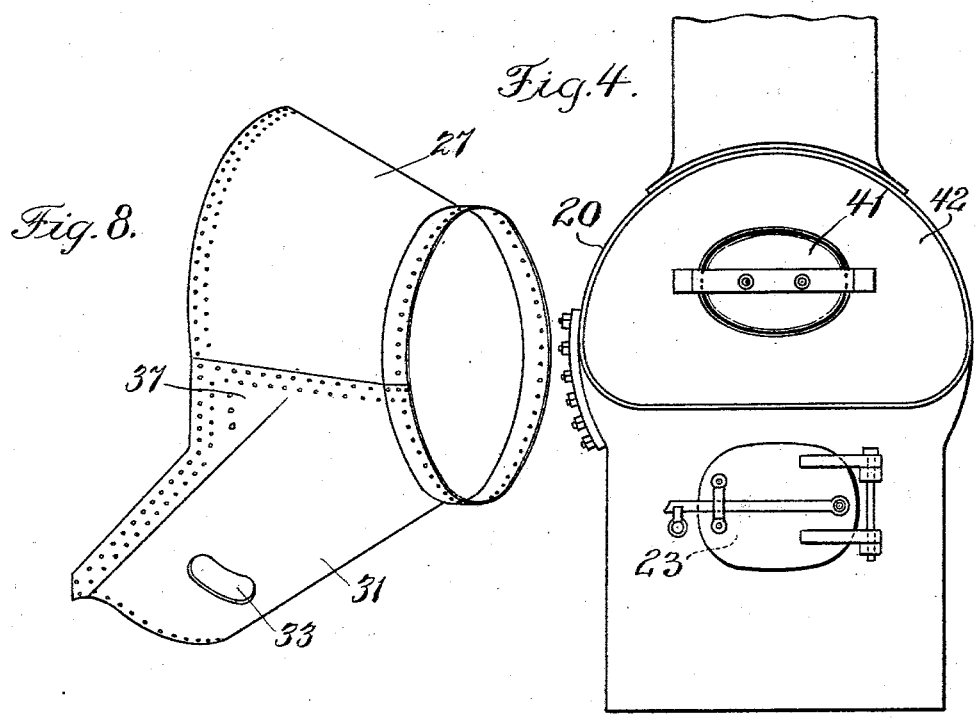
Witnesses:
Inventor:

No. 740,922. PATENTED OCT. 6, 1903.
G. H. RHEUTAN.
STEAM BOILER.
APPLICATION FILED DEC. 8, 1902.
NO MODEL. 5 SHEETS—SHEET 3.
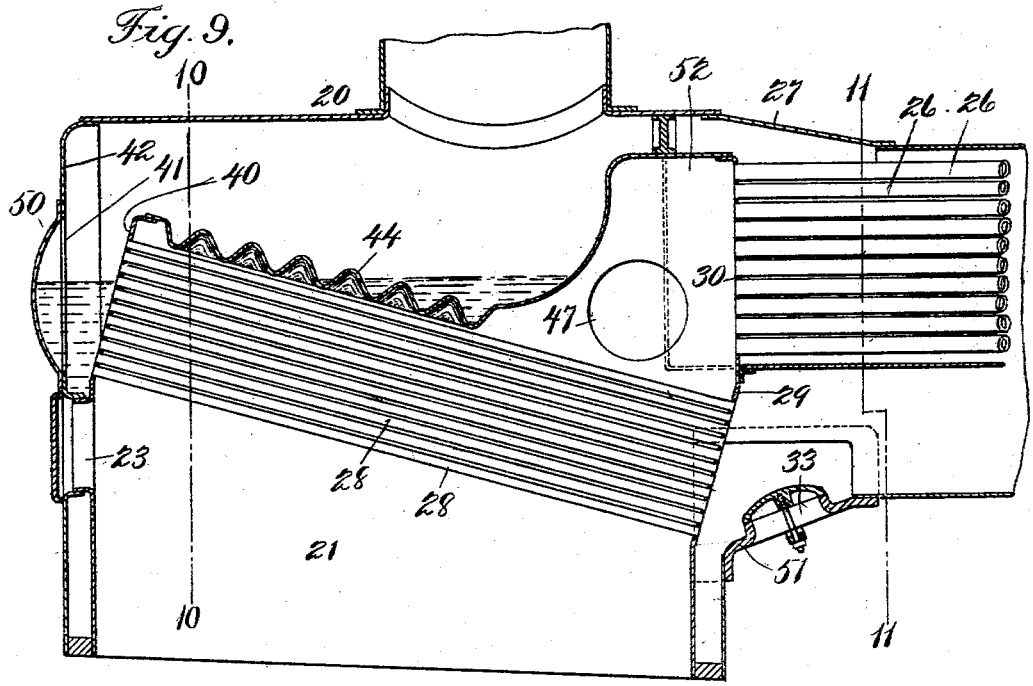
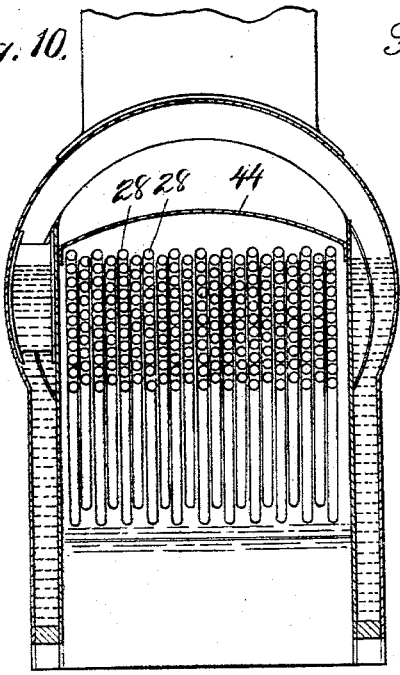
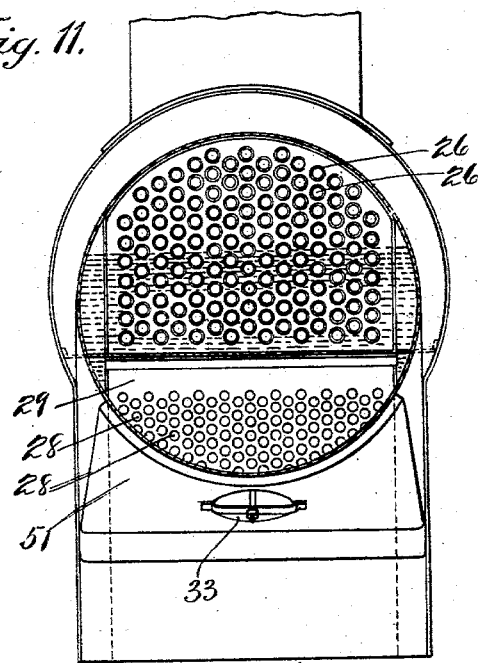
Witnesses:
Inventor:

No. 740,922. PATENTED OCT. 6, 1903.
G. H. RHEUTAN.
STEAM BOILER.
APPLICATION FILED DEC. 8, 1902.
NO MODEL. 5 SHEETS—SHEET 4.
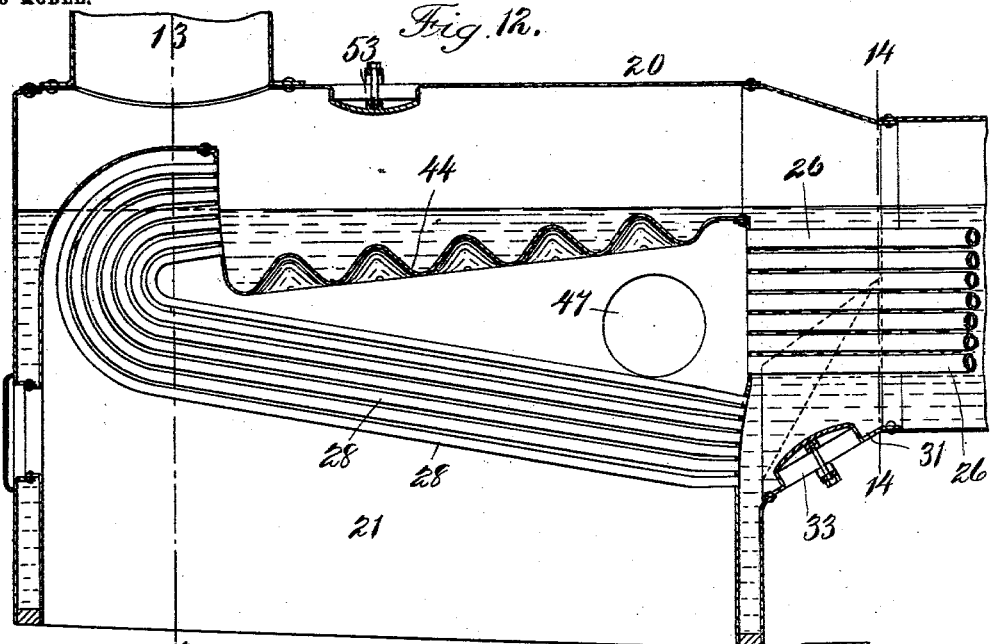
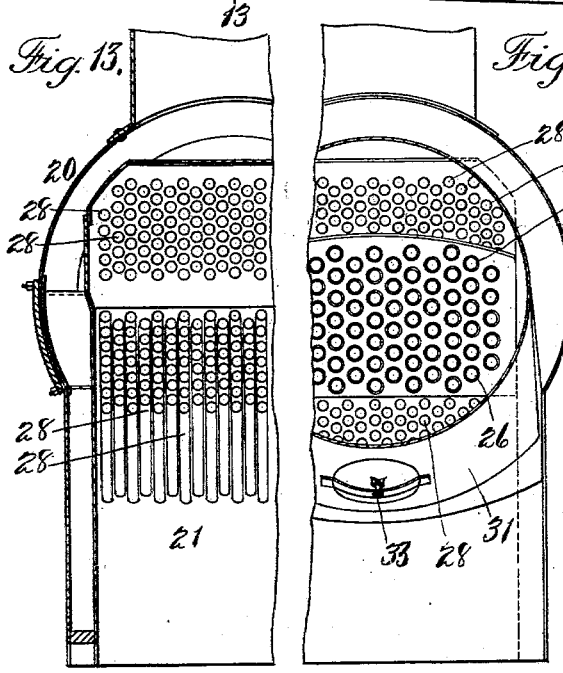
Witnesses:
Adeline C. Ratigan
E. Batchelder
Inventor:
Garrett H. Rheutan
by Wright, Brown & Quinby
Attys.

No. 740,922. PATENTED OCT. 6, 1903.
G. H. RHEUTAN.
STEAM BOILER.
APPLICATION FILED DEC. 8, 1902.
NO MODEL. 5 SHEETS—SHEET 5.

Witnesses:
Adeline C. Ratigan
E. Batchelder

Inventor:
Garrett H. Rheutan
by Wright, Brown & Quinby
Attys.

No. 740,922. Patented October 6, 1903.

UNITED STATES PATENT OFFICE.

GARRETT H. RHEUTAN, OF BOSTON, MASSACHUSETTS, ASSIGNOR OF ONE-HALF TO ROBERT B. LINCOLN, OF WALTHAM, MASSACHUSETTS.

STEAM-BOILER.

SPECIFICATION forming part of Letters Patent No. 740,922, dated October 6, 1903.

Application filed December 8, 1902. Serial No. 134,268. (No model.)

*To all whom it may concern:*

Be it known that I, GARRETT H. RHEUTAN, of Boston, in the county of Suffolk and State of Massachusetts, have invented certain new and useful Improvements in Steam-Boilers, of which the following is a specification.

This invention relates to steam-boilers having water-walled furnaces of the locomotive type; and its primary object is to increase the heating-surface and quick-steaming qualities of such boilers without increasing their general dimensions.

To this end my invention consists in a steam-boiler having certain characteristics of the locomotive type, which by long experience have proved their usefulness and adaptability for locomotive and similar services, but in which I have also introduced water-tubes the large heating-surface and quick-steaming qualities of which are well known. I have thus evolved a type of boiler combining the advantages of both the ordinary shell type of fire-tube locomotive-boiler and water-tube boilers.

Figure 1:
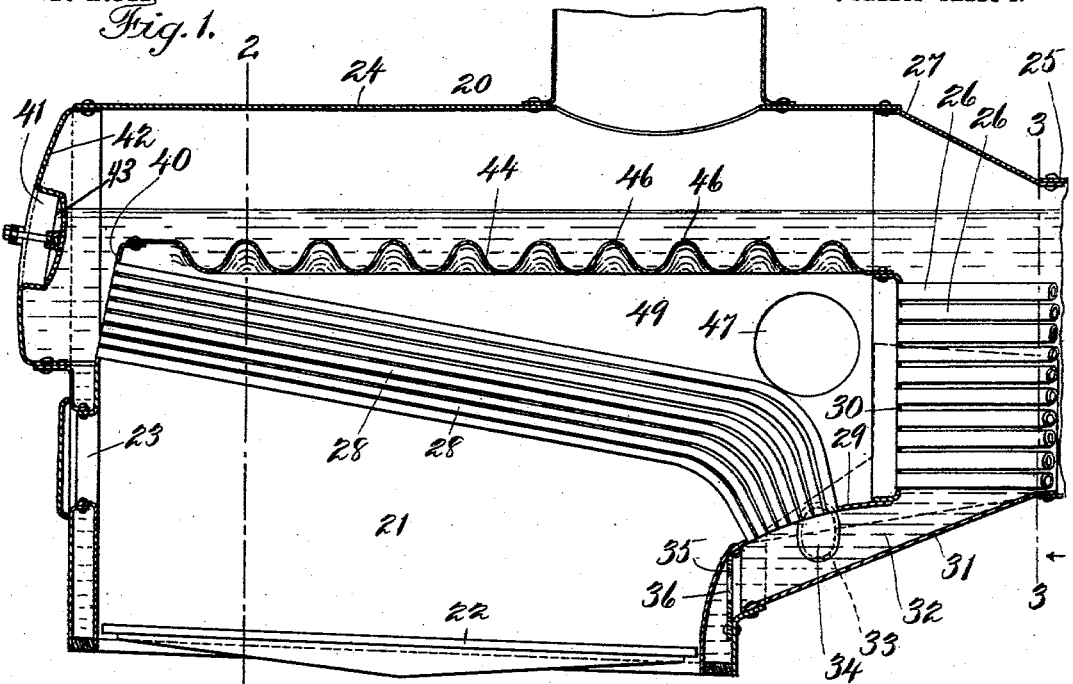
Figure 2:
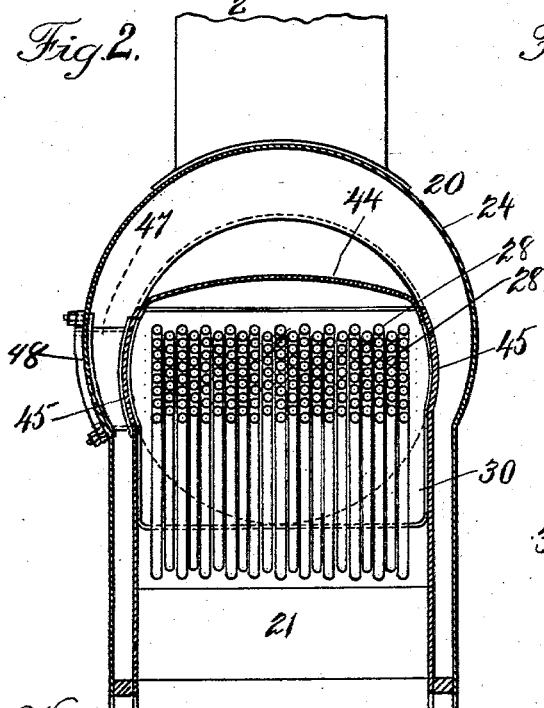
Figure 3:
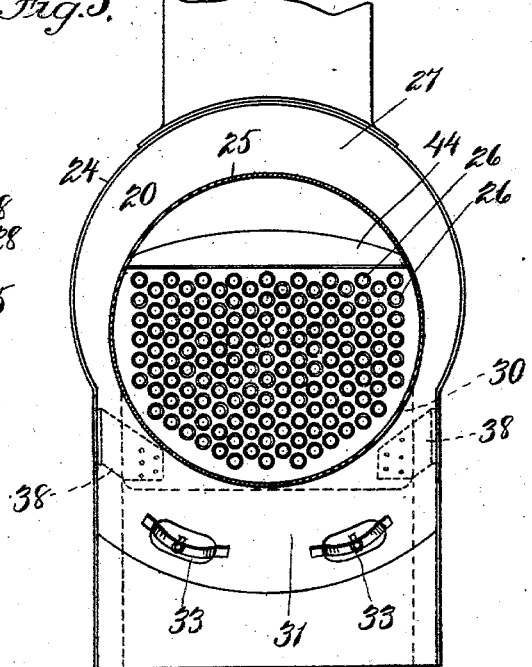
Figure 16:
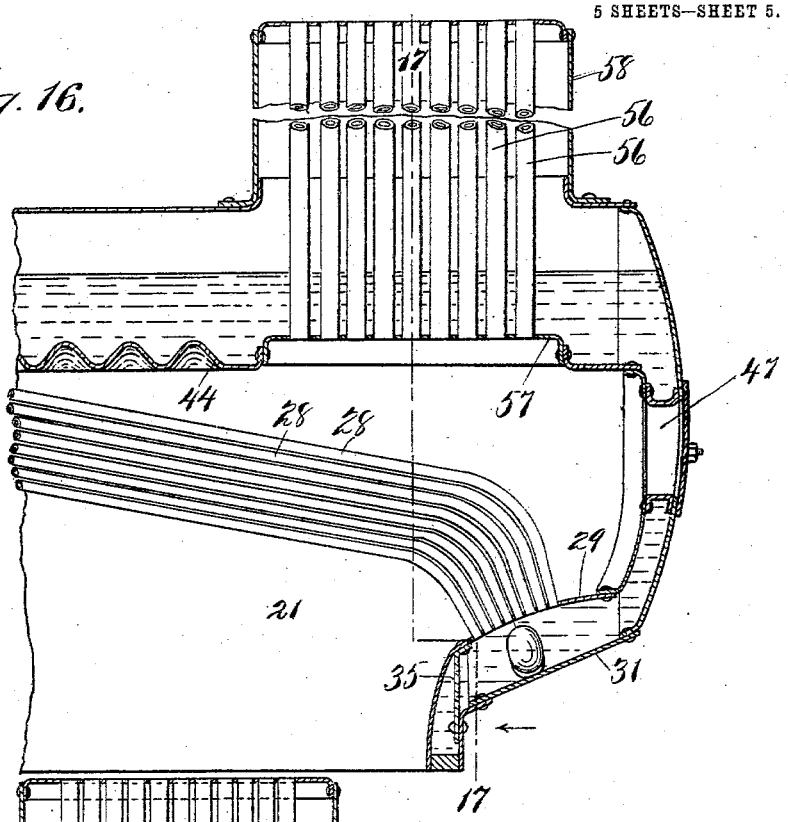
Figure 17:
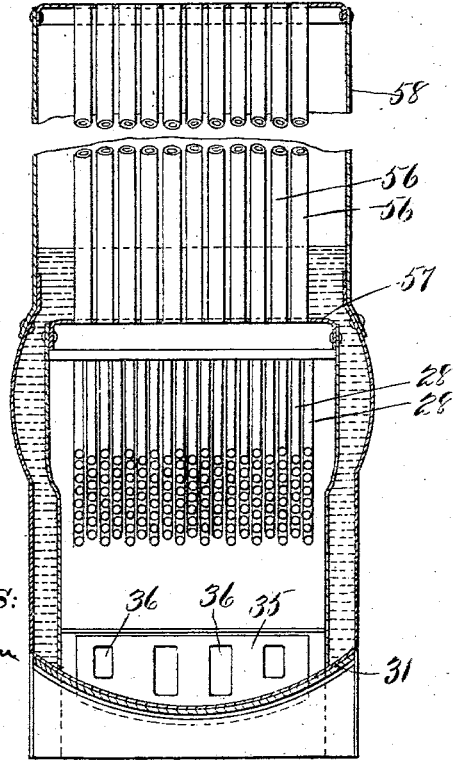

Of the accompanying drawings, Figure 1 represents a longitudinal vertical section of the rear portion of a boiler of the locomotive type constructed in accordance with my invention. Fig. 2 represents a section on line 2 2 of Fig. 1. Fig. 3 repesents a section on line 3 3 of Fig. 1. Fig. 4 represents a rear elevation of the boiler. Fig. 5 represents a top plan view of the corrugated crown-sheet. Fig. 6 represents a section on line 6 6 of Fig. 5. Fig. 7 represents a section on line 7 7 of Fig. 5. Fig. 8 represents a perspective view of the gusset connection. Fig. 9 represents a view similar to Fig. 1, showing another embodiment or modification. Fig. 10 represents a section on line 10 10 of Fig. 9. Fig. 11 represents a section on line 11 11 of Fig. 9. Fig. 12 represents a view similar to Fig. 1, showing another embodiment or modification. Fig. 13 represents a partial section on line 13 13 of Fig. 12. Fig. 14 represents a partial section on line 14 14 of Fig. 12. Fig. 15 represents a longitudinal vertical section showing another embodiment or modification. Fig. 16 represents a longitudinal vertical section of the front end of a boiler embodying another modification. Fig. 17 represents a section on line 17 17 of Fig. 16.

The same reference characters indicate the same parts in all the figures.

Referring to Figs. 1 to 8, inclusive, 20 represents the shell of a boiler of the locomotive type having a furnace 21 provided with grate 22 and firing-opening 23 in its rear wall. 24 designates the enlarged rear portion of the boiler embracing the furnace, 25 designates the forward or barrel portion traversed by the fire-tubes 26 26, and 27 designates the gusset connection between the rear and barrel portions 24 25.

According to my invention I introduce a group of water-tubes 28 28, traversing the furnace 21 longitudinally in a downwardly-inclined direction from rear to front, said tubes having bends near their front ends, as shown in Fig. 1, said front ends being fixed in a rearwardly-convexed longitudinally-sloping tube-sheet 29, forming the lower part of the front wall of the furnace below the vertical tube-sheet or head 30, in which the rear ends of the fire-tubes 26 26 are fixed. Below this tube-sheet 29 the gusset connection 27 has a longitudinally-sloping semiconical lower portion 31, separated from the tube-sheet 29 and fire-tubes 26 by a distance sufficient to form a chamber 32 for giving access to the ends of the water-tubes 28. This chamber is reached through apertures or hand-holes 33 33, formed in the gusset connection opposite the ends of the water-tubes and covered by removable plates 34. The sloping shell portion 31 and the sloping tube-sheet 29 are braced by a connecting-plate 35, extending across the lower part of the boiler and formed with apertures 36 to permit the circulation of water past it. By virtue of its conical or rounded form the lower part 31 of the gusset connection is self-supporting, the said connection being without flat portions with the exception of one on either side. (Indicated at 37 on one side in Fig. 8.) These flat portions may be braced by plates 38 38 (shown in dotted lines in Fig. 3) and extending from the gusset connection to the lower corners of the tube-sheet 30.

It will be noted that I have fixed the forward ends of the water-tubes 28 in a portion 29 (curved or convexed, so as to be self-supporting) in the furnace-wall forming the bottom or floor of the furnace forward of the grate 22. By fixing the tube ends in this manner I avoid forming a projection or water-leg extending into the furnace to receive the tube ends—a construction which would be objectionable on account of employing flat surfaces which require bracing and on account of its employing numerous plugs necessary for giving access to the tube ends and necessarily exposed to the action of the fire. The space 32 constitutes a substantial water-space from which an ample supply of water for circulation through the tubes 28 is drawn without causing such a rapid travel of the water as to produce erosion. There being a comparatively quiet body of water in this chamber, the lower part of the chamber is enabled to act as a collector of mud or sediment, and the size of the chamber is such as to allow the tube ends to be set from within the chamber.

The rear ends of the water-tubes 28 are fixed in a tube-sheet 40, forming the rear portion of the furnace-wall above the firing-opening 23, and access is had to said rear ends through a manhole 41, provided in the rear head 42 of the boiler-shell and covered by a plate 43. This rear head is convexed or swelled outwardly to give it strength and provide a space between itself and the tube-sheet 40 for access to the ends of the tubes. It is also made somewhat bean-shaped or kidney-shaped, as will be evident in Fig. 4, its lower edge extending substantially straight across the rear end wall of the boiler and being joined to the lower or flat part of this wall, which is flanged outwardly, as seen in Fig. 1. The above construction provides a horizontal overhanging shelf about midway of the rear wall, which constitutes a truss, giving added strength to said rear wall and a firm stiff anchorage, to which the inner or furnace shell may be connected by stays or bolts. It will be noted that the tube-sheet 40 is sloped upwardly and forwardly, thus contributing to the size of the space between said sheet and the head 42 for obtaining access to the tube ends.

The crown-sheet 44 of the furnace is a separate plate riveted to the upright side walls 45 45 and the front and rear walls of the furnace. The side edges of said crown-sheet are straight or non-sinuous to afford proper joints with the side walls 45; but between said side edges the sheet 44 is formed with a series of transverse corrugations 46 46 of elongated form, the effect of which is to greatly strengthen and give increased heating-surface and ability to contract and expand to the top wall of the furnace. This crown-sheet may or may not be stayed, depending somewhat upon the dimensions of the furnace.

It will be noted in Fig. 1 that there is a substantially triangular combustion-chamber 49, formed above the group of water-tubes 28 28, between said tubes and the walls of the furnace. At one side of this chamber I provide the side wall of the furnace with a manhole 47, adapted to admit the passage of a person and extending to the outside of the boiler-shell and provided with a cover-plate 48, the purpose of this aperture being to give access to the triangular chamber 49 and the rear ends of the fire-tubes 26.

From the foregoing description of the boiler it is evident that I have provided greatly-increased heating-surface in the shape of the water-tubes 28 28 without depriving the fire-tubes 26 of their ordinary functions. These water-tubes will of course deprive the products of combustion of some of their heat and will to that extent preserve and increase the life of the fire-tubes. The water-tubes also have the mechanical effect of bracing and strengthening the walls of the furnace. As crown-sheet stays are well-known features of boilers, I have omitted showing any in the drawings.

Of the modifications or varied embodiments selected to illustrate some of the forms which my invention may assume Figs. 9, 10, and 11 represent straight water-tubes 28 28, an inclined corrugated crown-sheet, a rear head 42 to the boiler-shell having an externally-applied convex plate 50 covering the opening 41 opposite the water-tube ends, and a cast-steel plate 51, forming the lower part of the gusset connection 27 and having a single large manhole 33 opposite the front ends of the water-tubes. Fig. 9 also indicates an upward extension 52 of the forward end of the furnace and the location of the upper ones of the fire-tubes 26 above the water-line, thus constituting these tubes' superheating-surface. Such non-immersion of the fire-tubes while questionable in ordinary practice is more readily permitted in my type of boiler by reason of the cooling of the gases by their contact with the water-tubes 28.

In the modification shown in Figs. 12, 13, and 14 the rear ends of the water-tubes 28 are recurved and fixed in a tube-sheet formed by turning up the rear portion of the crown-sheet 44. In this case access is had to the rear ends of these tubes through a manhole 53, formed in the top portion of the boiler-shell. The upper ends of certain of the tubes 28 reside above the water-line and constitute superheating-surface. In Fig. 15 the rear ends of the tubes 28 make a shorter turn and are fixed in a horizontal plate 54 in the crown-sheet, which may exist above or below the water-line, according to the height to which it is carried. This plate is shown directly below the steam-dome 55, and access to the ends of the tubes may therefore be had through the top of said dome.

In Figs. 16 and 17 I show the application of my invention to a boiler having the locomotive type of furnace, but with vertical fire-tubes 56 56, whose lower ends are immersed and fixed in a tube-plate 57 in the crown-sheet at the forward portion of the furnace above the forward ends of the water-tubes 28, but whose upper ends are carried into a dome 58 and constitute superheating-surface, the products of combustion passing off through a suitable flue. (Not shown.) The form of the group of water-tubes and other features is the same as in Fig. 1, but the man-hole 47 may in this case be carried through the front end of the boiler, as shown.

I claim—

1. A shell-boiler having a water-walled furnace of the locomotive type, fire-tubes extending from the furnace, a group of water-tubes traversing the furnace longitudinally thereof, and having their ends fixed in a tube-sheet at the rear of the furnace, and a rearwardly-convexed head forming the rear portion of the boiler-shell opposite said tube-sheet and departing from said sheet by a substantial distance to form a space-giving access to the tube ends, said head being formed with an aperture.

2. A boiler of the locomotive type having an outer shell, a furnace-grate, an inner shell forming the furnace-wall and separated from said outer shell by a water-space, said inner shell having a portion forming the floor or bottom of the furnace forward of the grate and separated from the outer shell by a water-space of substantial size, a group of inclined water-tubes traversing the furnace longitudinally and having their front ends fixed in said bottom or floor portion of the inner shell, the outer shell having an aperture to reach the interior of the last-said space, and a covering for said aperture.

3. A boiler of the locomotive type having an outer shell, a furnace-grate, an inner shell forming the furnace-wall and separated from said outer shell by a water-space, said inner shell having a portion forming the floor or bottom of the furnace forward of the grate and separated from the outer shell by a water-space of substantial size, a group of inclined water-tubes traversing the furnace longitudinally and having their front ends fixed in said bottom or floor portion of the inner shell, and fire-tubes proceeding from the furnace and having their ends fixed at the forward portion of the furnace above the forward ends of said water-tubes.

4. A boiler of the locomotive type having an outer shell, a furnace-grate, an inner shell forming the furnace-wall and separated from said outer shell by a water-space, said inner shell having an upwardly and forwardly sloping rearwardly-convexed portion forming the floor or bottom of the furnace forward of the grate and separated from the outer shell by a water-space of substantial size, and a group of inclined water-tubes traversing the furnace longitudinally and having their front ends fixed in said bottom or floor portion of the inner shell.

5. A boiler having a water-walled furnace of the locomotive type, a group of water-tubes traversing said furnace longitudinally above the grate and separated from the front portion of the furnace by a combustion space or chamber, and a series of substantially vertical fire-tubes proceeding from said combustion-chamber and having their lower ends fixed at the forward portion of the furnace in the crown-sheet thereof.

6. A shell-boiler having a water-walled furnace of the locomotive type, the shell of said boiler having an enlarged rear portion embracing the furnace, a reduced forward or barrel portion, and a gusset connection between said portions having a longitudinally-sloping semiconical lower portion, fire-tubes traversing said barrel portion, and a group of water-tubes traversing the furnace longitudinally thereof and having their front ends fixed in the furnace-wall below the rear ends of the fire-tubes, said gusset connection being formed with an aperture substantially opposite the front ends of said water-tubes.

7. A shell-boiler having a water-walled furnace of the locomotive type, the rear wall of whose outer shell is formed with a substantially flat lower portion, a rearwardly-convexed upper portion, and a substantially straight transverse horizontally-disposed shelf connecting said portions and overhanging the lower portion, said shelf being composed of outwardly and inwardly turned flanges formed integrally on said upper and lower portions respectively.

In testimony whereof I have affixed my signature in presence of two witnesses.

GARRETT H. RHEUTAN.

Witnesses:
ADELINE C. RATIGAN,
H. L. ROBBINS.